United States Patent [19]
Ali et al.

[11] 4,228,407
[45] Oct. 14, 1980

[54] ION-BEAM-EXCITED GAS LASER

[75] Inventors: A. Wahab Ali, Rockville; Jeffry Golden, Laurel; J. Gary Eden, Bowie; Redge A. Mahaffey, Wheaton, all of Md.; John A. Pasour, Alexandria, Va.

[73] Assignee: The United States of America as represented by the Secretary of the Navy, Washington, D.C.

[21] Appl. No.: 936,158

[22] Filed: Aug. 23, 1978

[51] Int. Cl.³ .............................................. H01S 3/09
[52] U.S. Cl. .......................... 331/94.5 P; 331/94.5 G
[58] Field of Search ....................... 331/94.5 P, 94.5 G

[56] References Cited
U.S. PATENT DOCUMENTS 4,110,703  8/1978  Jalufka et al. .................. 331/94.5 P

OTHER PUBLICATIONS

S. A. Golubev et al., "Effect of Proton Beam on the Generation of a $CO_2$ Gas Laser", *Soviet Physics JETP*, vol. 35, No. 2 Aug. 1972, pp. 244–247.
G. S. Hurst et al., "Proton Excitation of the Argon Atom", *Physical Review*, vol. 178, No. 1, 5 Feb. 1969, pp. 4–10.
Mahaffey et al., "Studies of Ion-Beam-Generation Efficiency with Reflex Tetrodes", *Appl Phys. Lett.* 32(9), May. 1, 1978, pp. 522–524.
Pasour et al., "Reflex Tetrode with Unidisectional Ion Flow", *Physical Review Letters*, vol. 40, No. 7, Feb. 13, 1978, pp. 448–451.

*Primary Examiner*—James W. Davie
*Attorney, Agent, or Firm*—R. S. Sciascia; Philip Schneider; Melvin L. Crane

[57]  ABSTRACT

A high-power gas laser pumped by an intense, pulsed, space charge-and current-neutralized ion beam. A high-pressure gas in the laser cavity is ionized by an ion beam. Atomic processes occur which result in a population inversion for the excited states of the gas. Coherent radiation is then emitted by the excited gas atoms in the inverted state. The light is amplified as it traverses the gas. Multiple traversal can be obtained by using an optical cavity comprising mirrors which reflect the light into the excited gas so that the light can be further amplified with each pass through the cavity. Extraction of light energy is done by using a partially transmitting mirror as part of the optical cavity.

33 Claims, 5 Drawing Figures

WAVELENGTH (nm)

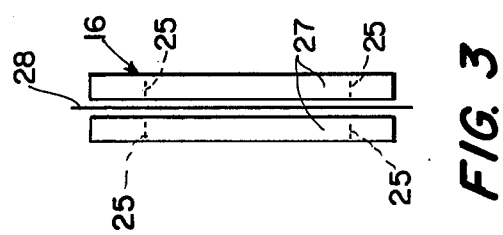
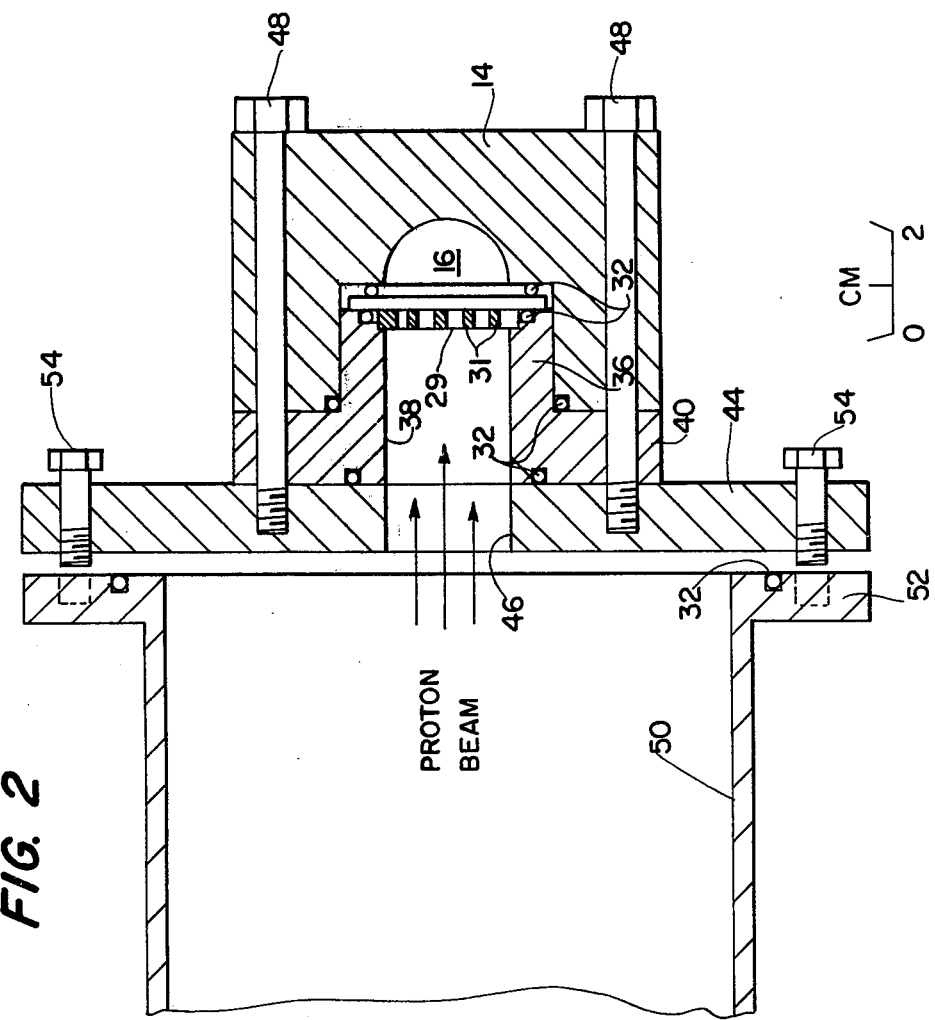

ION-BEAM-EXCITED GAS LASER

BACKGROUND OF THE INVENTION

This invention relates to a method and means for pumping gas lasers and more particularly to high-power gas lasers which are pumped by ion beams.

It is well known in the prior art that lasers of various types are in use and experimentation of new types are always under study. Such lasers include solid state, chemical and gaseous types. These laser types are pumped by intense light sources, other lasers, nuclear fission reactors, electron beams, and electric discharges. In another type of prior art laser, an ion beam is passed through a thin foil or sheet of material in order to make charge-exchange collisions and produce an inverted population of a lasing species.

Heretofore relativistic electron beams have been successfully applied to the excitation of high pressure gas lasers including XeF, HgCl, $He_2^+$—$N_2 \rightarrow N_2^+(B \rightarrow X)$, Ar—$N_2$, XeCl, and those type of lasers which are known as excimer lasers (e.g., xenon), energy transfer lasers (e.g., argon-nitrogen), carbon dioxide lasers, and other lasers which are commonly referred to as the rare-gas-halides (e.g. krypton fluoride and xenon fluoride) and the group-six lasers. For example, several rare gas halogen species have heretofore been made to lase by pumping with an electron beam. These lasers produce pulses of relatively short duration, typically sub-microsecond. In these prior art gas laser systems, a rare gas, e.g. argon, has been used as diluent. After initial ionization of the gas mixture, processes result which lead to a population inversion of the desired excited state species.

In the typical prior-art gas laser, a pulsed beam of electrons of 0.1 to 10 MeV energy and 50–100 nanosecond duration, produced in a diode, is passed through a metallic foil, e.g. 25 μm thick titanium, into a chamber filled with a high-pressure (1–10 atm) gas mixture. The optical axis of the laser is typically transverse to the direction in which the electron beam is injected into the gas cell. The efficiency, defined as the ratio of the output light energy to the electron energy deposited in the gas cell, has been found to be a few percent or less for these lasers.

SUMMARY OF THE INVENTION

The advantages of the present invention are attained by using an ion beam, which is space charge- and current-neutralized, to pump a high-pressure gas laser.

The use of ion beams for pumping gives a higher energy deposition per unit path length than is provided by electron beams. This results in higher power density and therefore more compact and efficient lasers.

BRIEF DESCRIPTION OF THE DRAWINGS

FIG. 2 is a cross-sectional view of the laser gas cell and ion-beam window assembly.

FIG. 3 is an enlarged view of the window assembly.

DETAILED DESCRIPTION

This invention includes the use of a pulsed ion beam to pump a high pressure gas medium in a gas laser utilizing gas mixtures such as those gases previously excited by electron beams. Upon injection into the gas medium, the ion beam creates ionization products which, after a sequence of chemical reactions and atomic processes, result in an inverted population of the lasing species.

Figure 1:
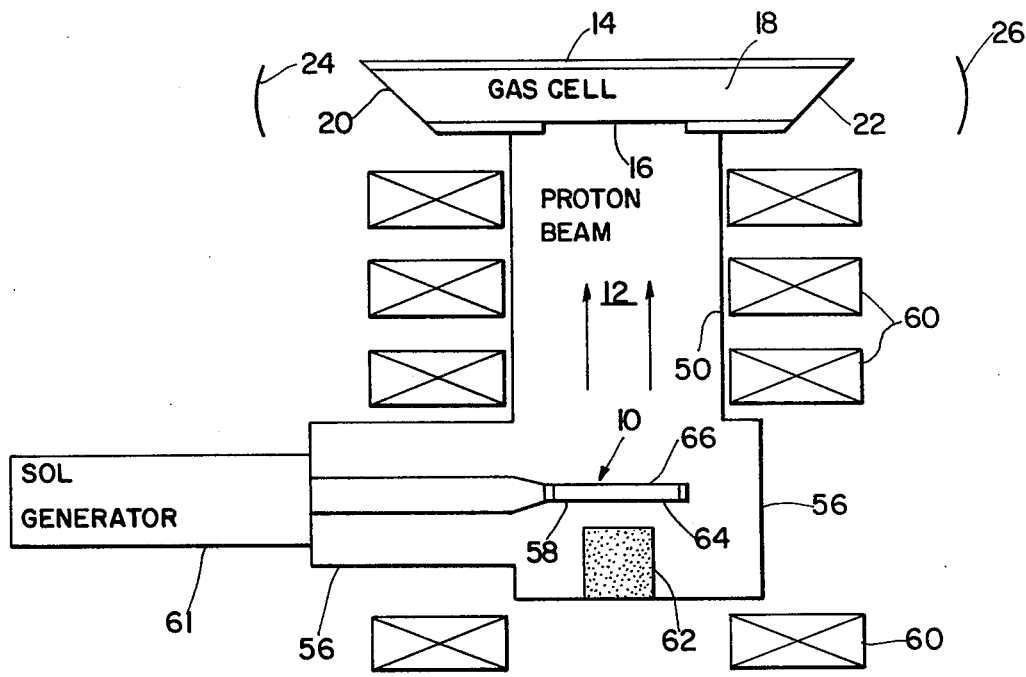
FIG. 1 is a partial schematic of an embodiment of an ion beam pumped laser system.

A laser system in which the ions employed are protons and a proton beam is used as a pump is set forth below where FIG. 1 is a partial schematic view which shows the relationship of the elements of the overall system. The overall system includes a proton source 10, an evacuated proton transport region 12, the laser cell 14 and an ion-beam window assembly 16 through which the protons enter the gas chamber 18 of the laser cell. The gas chamber is provided with end windows 20 and 22 placed at Brewster's angle with respect to the optical axis of the laser cell, and the laser is completed by typically mirrors 24 and 26 typically spherical placed opposite the end windows to form the optical cavity. One of the mirrors is partially transmitting to transmit the desired light energy. In some instances, the optic axis may be defined by only one mirror when the laser cell has sufficient length and gain so that it operates in the super radiant mode.

The laser cell 14 shown is made of a rectangular elongated block of any suitable material such as polyvinyl chloride, stainless steel, etc. The block is drilled along its elongated axis to form the gas chamber 18 and is then machined on its center perpendicular to the axis of the bore to form a rectangular cutout in which the ion-beam window assembly 16 is secured. Also, the ends of the block are cut at Brewster's angle so that suitable windows, such as Suprasil (VUV quality) quartz windows may be demountably attached.

The ion-beam window 28 through which protons pass (see FIG. 3) is made of a dielectric or metallic material which must have a thickness much less than the range of the protons in the proton beam within that material. It has been determined that a thin sheet of about 2–3 μm-thick polymer foil 28 such as Mylar, Kapton polycarbonate (e.g., Kimfol), polyethylene, or their equivalent, is satisfactory for beams with protons of greater than approximately 0.4 MeV energy. In order to avoid electric charging of the window, the window may also be made of a thin sheet of polymer foil having a thin layer of metal on its surface such as aluminized Mylar while the aluminum is at least several tens of nanometers thick and the total thickness of the polymer and metal layer is much less than the range of the proton beam within the combined materials. The window must be secured in place vacuum-tight and must withstand the pressure differential on its opposing sides. For this purpose, the foil window 28 is mounted in a foil window assembly 16 such as shown in FIG. 3 in which the foil window 28 is sandwiched between two rectangular support plates 27, e.g., made from aluminum each having a large opening (between the dotted lines 25) at least equal in length, and width to the smallest aperture through which the P-beam (proton beam) passes. The foil window 28 may be secured within the window assembly 16 with a suitable cement such as a room temperature vulcanizing silicone rubber. The foil assembly is supported on the proton beam transport region side by a support backing 29 including apertures 31 through which the proton beam passes. This support backing must have as high a transmission on the P-beam as possible and at the same time provide adequate structural support of the foil so that it can withstand the pressure differential between the proton beam transport region 12 side and the laser-cell gas chamber. As shown, the foil window assembly 16 has O-rings 32 secured near its outer edge on the gas chamber side with the backing plate 29 on the P-beam source side (See FIG. 2). The backing plate 29 and window assembly 16 are held in place by a rectangular insert 36 which has a rectangular passage 38 therethrough with dimensions at least as large as the opening in the foil assembly and which includes flange 40 that extends outwardly along the end of the gas chamber block cut-out. As shown, suitable O-rings 32 are provided wherever a vacuum seal may be necessary.

The gas chamber-laser cell and insert 36 are secured to a cylindrical adapter 44 which has a rectangular central aperture 46 with at least the same opening as the aperture 38 in the insert 36. The outer diameter of the adapter 44 is greater than the length of the gas-chamber laser cell and a means, viz., bolts 48, is provided by which the foil window assembly may be secured along the gas chamber and the laser cell secured to the P-beam transport region 12. The P-beam transport section is formed by a cylindrical element 50 which has an outwardly turned flange 52 that is secured to the adapter 44 by any suitable means such as bolts 54. The opposite end of the transport cylindrical element is secured to the P-beam source housing 56 (see FIG. 1). The P-beam source means 10 and the P-beam transport region 12 are assembled before evacuation; therefore, all connections must be vacuum tight. Magnetic field for guiding the P-beam is applied along the axis of the transport region and P-beam source by means of electromagnetic coils 60. The magnetic field must extend sufficiently toward the laser cell that the proton beam will be guided into the gas chamber of the laser cell.

The gas cell may be excited by any suitable intense proton beam having energies in the range from about 0.1 to 2 MeV and current densities exceeding 0.001 kA/cm$^2$ depending on the thickness of the foil window, and having a pulse about 10 microseconds. Such beams may be produced by a variety of devices such as reflex triodes, magnetically insulated diodes, cylindrical double diodes, pinched electron beam diodes (pinch-reflex diodes) and reflex tetrodes. The P-beam source shown in FIG. 1 is a reflex tetrode powered by a Seven Ohm Line (SOL) Generator 61. The reflex tetrode comprises a 5.0 cm diameter grounded graphite cathode 62 and two parallel, spaced anodes 64 and 66, centered in the axis of the P-beam transport region, to which a positive voltage pulse of 450 keV and 50 ns duration (FWHM) is applied. The first anode 64 consists of 6.3 $\mu$m-thick, aluminized Mylar foil spaced 2.2 cm from the cathode 62. The second anode 66 is a 12.5 $\mu$m-thick polyethylene film spaced 6 mm from the first anode 64. The P-beam operates in a vacuum of about 0.9 millitorr. A reflex tetrode as set forth herein has been described in the following articles: *Physical Review Letters,* 40, page 448, Feb. 13, 1978; and *Applied Physics Letters,* 32, page 522, May 1, 1978.

In carrying out the teaching of this invention, a laser system with the following parameters has been built and is set forth herein by way of example. The gas chamber has an inner diameter of 2.5 cm, a size which exceeds the proton range in the gas, and with the long length between the Brewster window being 30 cm., a distance larger than the extent of the P-beam excited gas. The dielectric mirrors that complete the optical cavity are separated by 70 cm and have a radius of curvature of 5 m. At least one mirror has a high reflectivity of about 99.8%. The transport region 12 has an inside diameter of 14.6 cm with a length sufficient for a spacing of 24 cm between the anode and the P-beam window. The window is of 3 $\mu$m-thick Mylar and has a length of about 10 centimeters which is approximately half the length of the gas chamber. The laser cell is either made of or surfaced with metal and is electrically grounded to prevent any build-up of electric charge on the walls.

In operation, subsequent to assembly, the gas cell is evacuated to the desired vacuum pressure of $<10^{-2}$ Torr depending on the gas mixture to be used and then filled with the desired gas mixture at the desired pressure of from 0.1–10 atm, the mirrors of the laser cavity are then aligned with the optic axis, and a P-beam of from 0.2–5 MeV is prepared for operation. The P-beam source area and transport region are evacuated to the desired vacuum pressure which is typically no greater than about 1.0 milletorr. Evacuation may be performed by a single vacuum pump with appropriate valving or by separate vacuum pumps. The evacuation and gas filling systems have not been shown since they are obvious and well known in the art. It is important during evacuation that the pressure differential on opposite sides of the foil window not be too great because the foil may be damaged. The pressure differential can be alleviated by a valved bypass tube. Once the system has been evacuated, the gas is added to the laser-cell chamber, and the mirror axes are aligned along the optic axis of the optical cavity; the system is then ready for operation. For best operation, it is important that the mirrors be aligned after the gas has been added to the cell.

Figure 4:
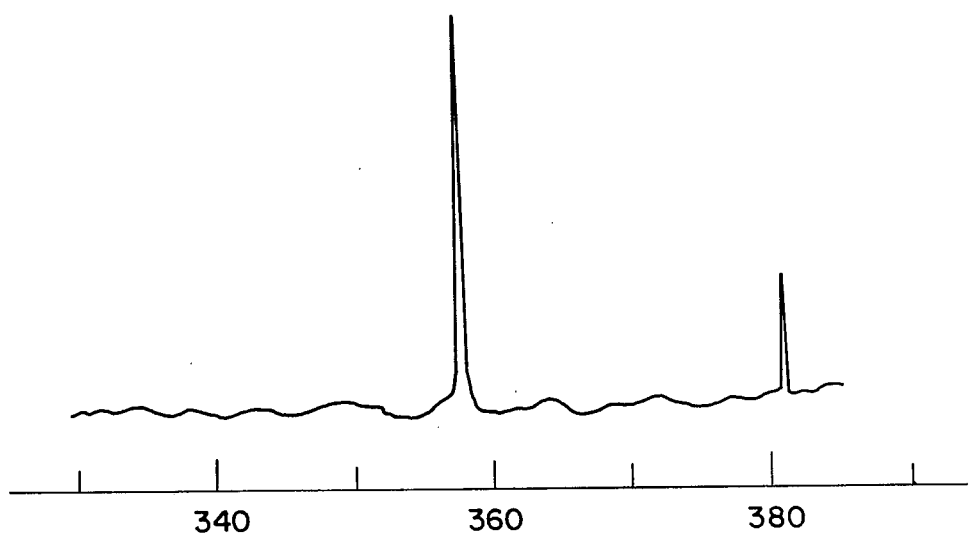
FIG. 4 illustrates the output spectrum of an Ar—$N_2$ type laser.

As a first example of operation the laser gas chamber is evacuated to a pressure of less then $10^{-2}$ Torr and filled with a 95% Argon-5% nitrogen gas mixture to a pressure of about one atmosphere. The vacuum chamber on the P-beam side of the ion-beam window is evacuated to a pressure of less than 0.9 mill-Torr. A positive voltage pulse of 460 keV and 50 ns duration is applied to the pair of anodes of the reflex tetrode. Upon application of the pulse to the anodes, electrons are emitted from the cathode accelerate to and penetrate the anodes, and form a virtual cathode downstream. As the electrons reflex between the virtual and real cathodes, plasma is formed an anode 66, and protons are accelerated toward the virtual cathode. As the protons exit the virtual cathode and form a drifting P-beam, electrons are dragged along; thus, the proton beam is space charge-/and current-neutralized and travels away from the diode toward the ion-beam window. The proton beam of 450 keV propagates through the drift region to the ion-beam window of the gas chamber. After passing through the window, the incident 450 keV protons have approximately 200 keV of energy. With approximately one atmosphere of gas in the gas chamber, the proton range is about 5 mm. The proton beam ionizes the gas mixture and, as a result of the ionization, atomic processes occur which result in a population inversion for the excited states of nitrogen. Coherent radiation is then emitted by the excited molecules in the inverted state. The emitted coherent radiation is amplified as it traverses the gas in the gas chamber. The mirrors of the optical cavity reflect the radiation back and forth through the amplifying medium many times resulting in enhanced amplification. Since one of the mirrors is partially transmitting, light energy is extracted from the cavity. With the gas mixture, etc., as set forth above, stimulated emission at 357.7 and 380.5 nm corresponding to the $v'=0 \rightarrow v''=1$ and $v''=0 \rightarrow v''=2$ transitions, respectively of the $N_2(C \rightarrow B)$ band have been obtained. FIG. 4 illustrates the laser output spectrum observed with a spectrograph having 0.2 Å resolution. It has also been determined that the spot size was 1.3 cm in diameter at a distance of 1 meter from the output mirror. This indicates a beam divergence of approximately 13 milliradians. As a second example, the gas chamber was evacuated to a vacuum of $10^{-2}$ Torr and a gas filling of 97% argon or neon, 2.6% Xenon and 0.4% $NF_3$, was used. With this filling lasing of the XeF* species was observed at 351.1 and 353 nm.

Most of the processes by which ions and electrons in a beam lose their energy to the gas filling produce ionization. For a given energy, the ion velocity is much less than that of an electron; consequently the range of the ion is less than that of an electron for the same energy resulting in a higher energy deposition per unit path length. This higher energy deposition by ions causes more ionization of the gas, and since the amount of light produced per unit volume is approximately proportional to how much ionization is produced, the use of ion beams is believed to achieve higher power density levels and, therefore, more compact and higher efficiency lasers. Since ions have a short range in a high-pressure gas, the ion-beam window must be placed near the laser axis to take advantage of the short range of the ions. Further, the ion beam window must be of a thin material so that the ion-beam energy will be efficiently transmitted through the window to ionize the gas.

There are at least three important factors relative to the use of an ion-beam pump for gas lasers. (1) The ion source used must be sufficiently intense to produce the necessary ionization; (2) a suitable window must be used which is strong enough to withstand the pressure differential and yet thin enough and of a material which will transmit the desired ion beam; and (3) the laser cell construction must be compatible with the ion beam window and with the fact that the ions have a limited range.

The gas cell and vacuum chamber may be made of any compatible materials which can withstand the necessary pressures. However, a metallic screen or liner may be desirable if dielectric materials are used to prevent electric-charge buildup on the walls.

The gas mixtures useful in this invention may be varied in concentration, pressure, choice of gas, and gas mixtures to obtain outputs of different wavelengths. The gases and gas mixtures used can be any of those used in E-beam pumped lasers especially the rare-gas-halides which include mixtures comprising at least one rare gas and a halogen bearing gas such as argon, xenon, and fluorine; argon, xenon, and nitrogen trifluoride; neon, xenon, and nitrogen trifluoride and the excimer lasers such as argon, neon; xenon; krypton-fluoride; helium; nitrogen; carbon dioxide; krypton; radon; hydrogen; also the charge exchange and energy exchange lasers such as helium and nitrogen; argon and nitrogen; helium and oxygen; xenon and oxygen; and other well known E-beam pumped lasers.

The use of higher energy ions permits the use of thicker ion-beam window foils. As a consequence, higher gas pressures may be used. Also a larger volume of gas having a larger optical aperture may be excited for a given pressure since the proton range is larger for higher energies.

More than one ion-beam source may be used so that an ion beam enters the gas from more than one side. Similarly, a coaxial source or source producing a radial ion flow may be used so that the ions enter the gas from all radial directions.

Figure 5:
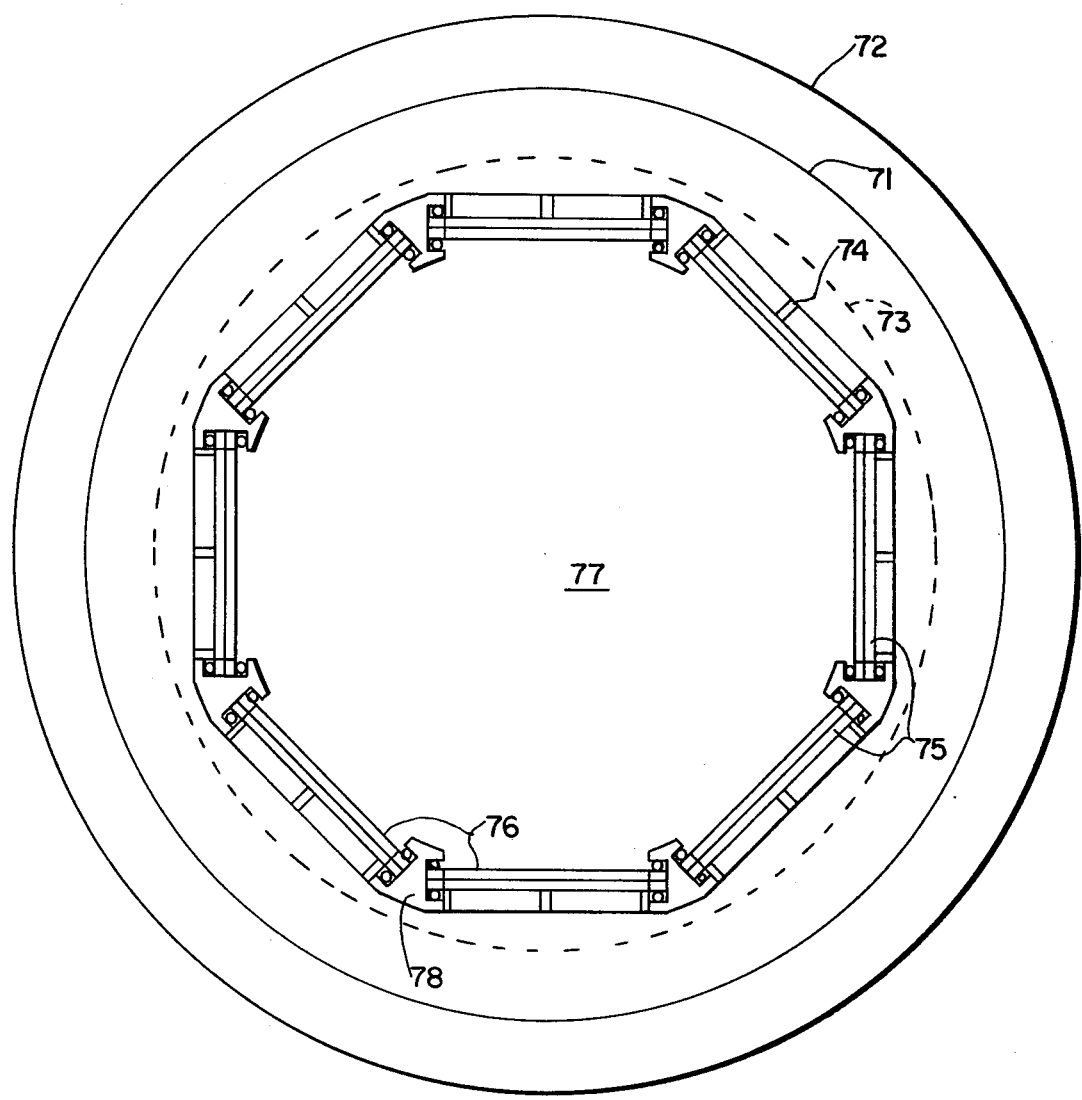
FIG. 5 illustrates a partial cross-sectional view of an embodiment of an ion beam pumped laser in which the intense ion beam flows radially inward into the laser gas cell.

See FIG. 5 in which the ion source is a cylindrical double diode having an anode 71 and two cathodes 72 and 73 where cathode 73 is made of a metal screen or metal foil which is highly transparent to the ions. The ions pass through holes in support backing plates 74 and pass through an array of ion beam windows 75, each held in a window assembly 76, into the region 77 containing the high pressure laser gas mixture within the laser cell 78. The window assemblies 76 are arrayed about the surface of a cylinder to allow the ion beam to irradiate the gas from all radial directions. The cylindrical and optic axis is oriented along the central axis 77.

Other ions may be used instead of protons, for example, negative hydrogen ions deuterons or tritium ions. Typically, these ions can be produced by the same devices which produce protons by replacing that material which is the source of protons with deuterated or tritiated materials. Heavier ions may also be used but these ions (e.g., carbon, aluminum, iodine, uranium, etc.) must have energies about or exceeding 0.1 MeV/amu. The use of very high energy heavy ions may permit the excitation of large gas volumes having large optical apertures.

Obviously many modifications and variations of the present invention are possible in light of the above teachings. It is therefore to be understood that within the scope of the appended claims the invention may be practiced otherwise than as specifically described.

What is claimed and desired to be secured by Letters Patent of the United States is:

1. In a high-pressure gas laser system comprising a high pressure gas cell filled with one or more laser gases at a total pressure greater than 0.1 atmosphere but not more than 10 atmospheres, said system including Brewster angle windows which are transparent to the laser output at each end of the gas cell in optical alignment about the optical axis of said gas cell and which provide a means for extraction of laser radiation, the improvement comprising:

means for producing a directed, pulsed beam of ions with sufficient energy and density to provide a pump source to excite said high-pressure gas in the laser system so that a population inversion results for an excited state of the laser gas.

2. The improvement of claim 1 in which:
   the ions are hydrogen ions with the energy of said ions ranging from about 0.1 to 2.0 MeV per atomic mass unit with a current density exceeding 0.001 $kA/cm^2$.

3. The improvement of claim 1 in which:
   the ions are protons and the proton source has a voltage pulse of 300–2000 kV with a pulse duration of 10 nsec-10 μsec.

4. An ion-beam-excitable gas laser which comprises:
   an elongated gas cell with end windows at Brewsters angle with respect to the laser's optic axis;
   a laser gas medium filling said gas cell,
   said laser gas medium comprising an ion beam excitable gaseous mixture with a total pressure greater than 0.1 atmosphere and not greater than 10 atmospheres;

a ion beam window secured to said gas cell such that a line that is normal to the surface of the ion beam window is perpendicular to the optic axis of said gas cell;

said ion beam window being made of a material sufficiently thin to transmit an intense ion beam into said gas cell and sufficiently near the axis of said gas cell for the range of transmitted ions to reach the axis of said gas cell;

ion source means for directing an intense ion beam pulse in an evacuated surrounding through said window into said gas, the intensity of said ion beam being of sufficient energy and density to provide a pump source to excite said gas mixture and produce population inversion of the laser gas.

5. A laser as in claim 4, in which:

said window is made of a thin polymer sheet.

6. A laser as in claim 5 in which:

said window material is selected from Mylar, Kapton polycarbonate, and polyethylene.

7. A laser as in claim 6 in which:

said window is Mylar.

8. A laser claimed in claim 4 in which:

said window is made from a thin polymer sheet having a thin metal film on its surface.

9. A laser as in claim 4 wherein:

said window is backed by a support means with at least 50% of said support means transparent to incident ions.

10. A laser as in claim 4 in which:

the ions are heavy ions of atomic mass greater than or equal to three and said ions have an energy of about 0.1 MeV per atomic mass unit or more.

11. A laser as in claim 4 in which:

said ions are hydrogen ions which are selected from the group consisting of protons, deuterons, tritium ions, and negative hydrogen ions.

12. A laser as in claim 4 in which:

said ions are protons.

13. A laser as in claim 4 wherein:

said ion source is in an evacuated element at a vacuum pressure of about 1.0 milli-Torr, and said window is subjected to a high-gas-pressure, ion excitable gas mixture on one side thereof.

14. A laser as in claim 4 in which:

said proton source is in an evacuated housing;

a magnetic guide field which permeates said evacuated housing directs an intense proton beam pulse into the gas medium of the laser.

15. A laser as in claim 4 wherein:

said laser cell has a gaseous mixture at a pressure of from about 0.5 atm to about 2 atm.

16. A laser as in claim 15 wherein:

said gas mixture comprises at least one rare-gas and a halogen-bearing gas.

17. A laser as in claim 15 wherein:

said gas mixture comprises about 97% Ar/2.6% Xe/0.4% $NF_3$.

18. A laser as in claim 15 wherein:

said gas mixture comprises Ar, Xe, $F_2$.

19. A laser as in claim 15 wherein:

said gas mixture comprises He and $N_2$ gas.

20. A laser as in claim 15 wherein:

said gaseous mixture comprises from about 90–99% argon and 1–10% nitrogen.

21. A laser as in claim 15 wherein:

said lasing gas is selected from one of the following gases; helium, neon, argon, krypton, xenon, and radon.

22. A laser as in claim 15 wherein:

said gas mixture is selected from the following combination; helium and oxygen; carbon dioxide, nitrogen and helium; water vapor; and helium and neon.

23. A laser as in claim 4 wherein:

an optical axis is defined by a single mirror;

and said gas cell has sufficient length and gain so that the laser operates in a super-radiant mode.

24. A laser as in claim 4 in which:

an optical cavity comprises two highly reflecting mirrors of which one is a partially transmitting mirror, one mirror opposite each end of said gas cell and aligned along the optical axis of the gas cell.

25. A laser as stated in claim 24 in which:

each of said mirrors has a high transmission.

26. A method of exciting a gas mixture in a chamber of a pulsed gas laser which comprises:

filling said chamber with a volume of high-pressure gas at a pressure greater than 0.1 atmosphere and not more than 10 atmospheres; and directing an intense ion beam into said volume of gas while in an unexcited state whereby ionization of the gas occurs and a population inversion of an excited species is produced.

27. A method as claimed in claim 26 which includes:

directing a radially inward flowing intense ion beam into said volume of gas.

28. A method as claimed in claim 26 in which:

said ions are hydrogen ions.

29. A method as claimed in claim 26 in which:

said gas is a mixture which comprises at least one rare gas and one halogen-bearing gas 30. A method as claimed in claim 26 in which:

said gas is a mixture selected from one of the following combinations of gases;

argon and nitrogen; helium and nitrogen; carbon dioxide, helium and nitrogen; helium and oxygen; helium and neon; and water vapor.

31. A method as claimed in claim 28 in which:

said lasing gas is selected from one of the following gases: helium; neon, krypton, xenon, argon, and radon.

32. A method as claimed in claim 28 which comprises:

positioning a light-reflecting mirror opposite each end of said chamber and accurately aligning said mirrors to be coaxial with said chamber whereby an optical axis is defined along which lasing occurs.

33. A method as claimed in claim 32 in which:

said mirrors are aligned subsequent to filling said chamber with said gaseous mixture.

* * * * *